March 30, 1965 B. R. LESSER ETAL 3,175,839
SLED
Filed March 23, 1964 3 Sheets-Sheet 1
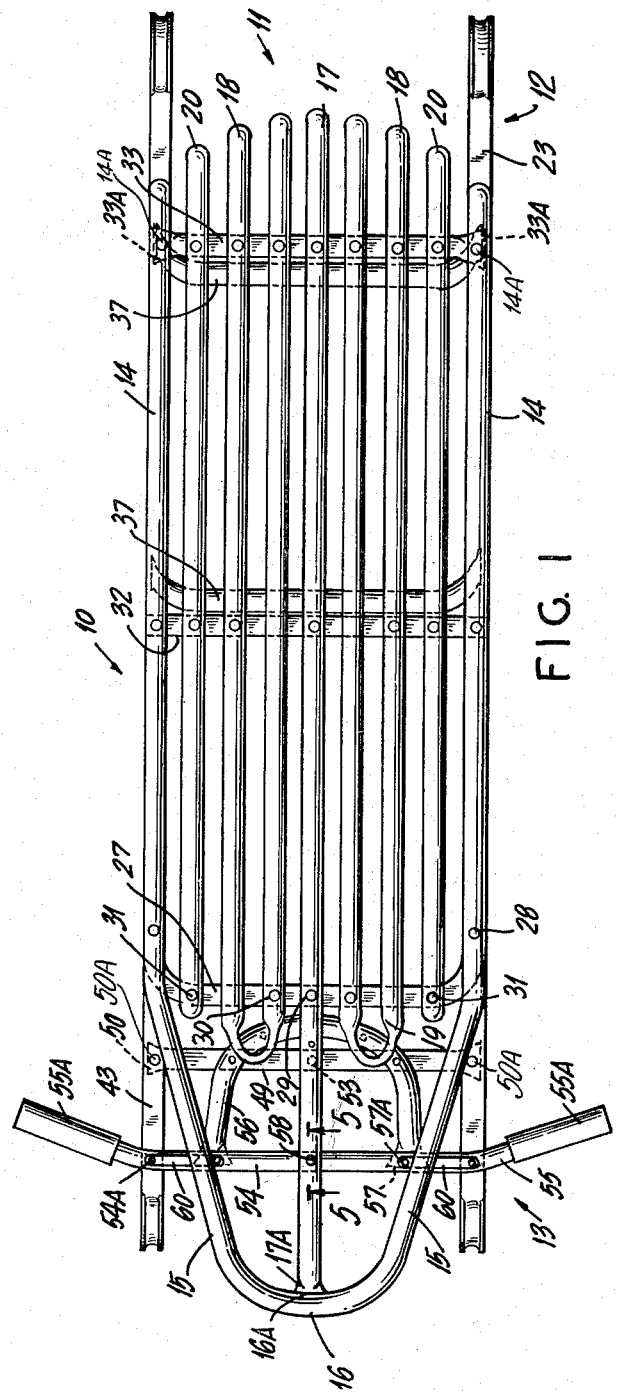
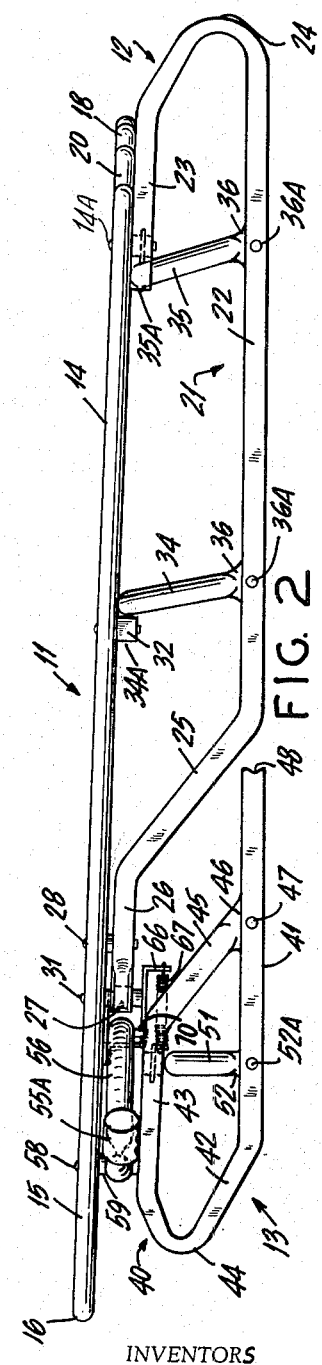
INVENTORS
BERTRAND R. LESSER
MORTON I. THOMAS
BY
ATTORNEY March 30, 1965 B. R. LESSER ETAL 3,175,839
SLED
Filed March 23, 1964 3 Sheets-Sheet 2

INVENTORS
BERTRAND R. LESSER
MORTON I. THOMAS
BY
ATTORNEY

INVENTORS
BERTRAND R. LESSER
MORTON I. THOMAS

BY

ATTORNEY

United States Patent Office 3,175,839
Patented Mar. 30, 1965

---

3,175,839
SLED
Bertrand R. Lesser, 24 Stonewall Lane, Mamaroneck, N.Y., and Morton I. Thomas, Bakertown Road, Monroe, N.Y.
Filed Mar. 23, 1964, Ser. No. 353,817
10 Claims. (Cl. 280—16)

This invention relates to sleds, and more particularly concerns sled constructions of the steerable type.

An object of this invention is to provide an improved sled construction which includes front and rear runner sections mounted on a deck section, with an improved articulation of the front runner section on the forepart of the deck section to allow for steering of the sled with maximum precision and safety.

Another object of this invention is to provide an improved sled construction made of light weight metal tubing; such tubing being used to form the deck, rear runner and front runner sections whereby to minimize the overall weight of the sled thereby facilitating the use thereof; the tubular runners having a configuration which insures stability and optimum support for a wide variety of snow conditions.

A further object of this invention is to provide a sled construction in which the front runner section is coupled to the forepart of the deck section thereof in a manner to obtain instant precision steering action at all times when the sled is in use, with a minimum amount of physical effort; such coupling including a bearing system which will operate freely under the most severe environmental conditions of ice and snow.

Still another object of this invention is to provide an improved sled construction comprising a deck section, rear and front runner sections and steering means interconnecting the front runner section with the forepart of the deck section, all sections and the steering means being formed of light metal tubing whereby to minimize the weight of the sled, yet maintaining a high resistance to stress and impact forces, to improve the steering response of the front runner section, to render the same immune to deterioration and operational difficulties despite exposure thereof to adverse climatic conditions, and to enable the same to lend itself to economical manufacture yet presenting in its finished form a pleasing and attractive appearance.

Other objects of this invention will in part be obvious and in part hereinafter pointed out.

In the drawings,

FIG. 1 is a top plan view of a sled construction embodying the invention;

FIG. 2 is a side elevational view thereof;

Figure 3:
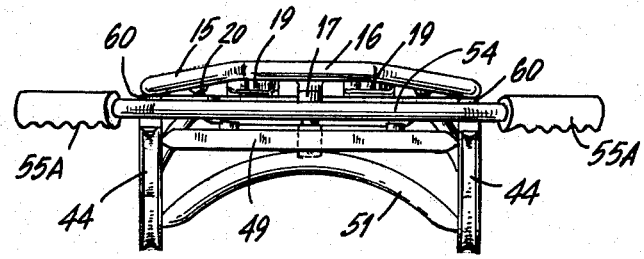
FIG. 3 is a front elevational view thereof.

Essentially, the sled construction of the instant invention comprises a deck section, a rear runner section affixed to the underside of the deck section and a front runner section articulated to the underside of the forepart of the deck section with a novel bearing system to allow for precision steering of the sled; the several sections being made of bent light metal tubing.

Thus, as shown in the drawings, 10 designates a sled construction embodying the invention. The same comprises a flat deck section generally indicated at 11, a rear runner section 12 affixed to the underside of deck section 11, and a steering front runner section 13 pivotally mounted on the underside of a foreportion of deck section 11; the front runner section being normally aligned with the rear runner section 12.

The deck section 11 is formed of metal tubing such as aluminum or aluminum alloy tubing which has a diameter of the order of about 1", the wall thickness of the tubing being selected to provide desired rigidity yet minimizing unit weight.

Deck section 11 comprises a pair of parallel, outer rail portions 14 interconnected at their forward ends by integral converging rail portions 15 and a centrally disposed arcuate nose rail portion 16; the several rail portions being formed by bending a single piece of tubing, in a known manner.

The deck section 11 further includes spaced, parallel tubular elements disposed between outer rail portions 14 and including a centrally located single tubular member 17 which extends at its forward end into engagement with nose rail portion 16, said rail portion 16 being slotted on its inner edges as at 16A to receive the flattened forward end portion 17A of tubular member 17. On either side of member 17 there is disposed bent, doubled, parallel members 18 having bight portions 19 at their forward ends, and single tubular members 20 which are located between outer rail portions 14 and members 18. The bight portions 19 are disposed slightly forward of the juncture of rail portions 14, 15 while members 20 terminate at their forward ends at the juncture of rail portions 14, 15.

The rear runner section 12 is made up of a single piece of metal tubing of rectangular or square section, generally indicated at 21. Such tubing is bent by appropriate means to provide parallel runner portions 22, deck support portions 23 above and parallel to runner portions 22 and arcuate portions 24 connecting the rear portions of runner portions 22 and deck support portions 23. Tubing 21 further includes upwardly and forwardly inclined parallel portions 25 extending from the forward end portions of runner portions 22 and then parallel, short forward deck supporting portions 26 which are substantially coplanar with and longitudinally aligned with rear deck supporting portions 23.

Forward deck supporting portions 26 are interconnected by a transversely extending deck supporting portion 27 integral therewith, said deck supporting portion 27 being located adjacent the juncture of rail portions 14, 15.

The deck section 11 is secured to the underlying rear runner section 12 by rivets or the like, the outer rail portions 14 being secured to the forward deck supporting portions 26 as at 28, while the deck members 17, 18, 20 are secured at their forward ends to the underlying transverse deck supporting portion 27, as at 29, 30 and 31 respectively. Members 17, 18, 20 and outer rail portions 14 are further interconnected at a point intermediate their ends, by an underlying transversely disposed tubular member 32 by suitable rivet connections, and similarly at the rear ends thereof by an underlying transversely disposed tubular member 33 and rivet connectors.

The rear member 33 has its opposite end portions flattened as at 33A and received in slots formed in the inner sides of rear deck supporting portions 23 at the ends thereof and secured in place by a rivet, not shown. The rear ends of outer rail portions 14 overlie the forwarding extending end portions of rear deck supporting portions 23, being secured together by rivets 14A.

A pair of similar arched braces of tubular metal as at 34, 35 interconnect the rear runner portions 22 with the deck section 11. The braces 34, 35 have their outer ends flattened as at 36 and received in slots formed in the top surfaces of the rear runner portions 22, being secured in place by cross rivets 36A. The flat portions 37 of braces 34, 35 underlie the deck members 17, 18, 20 and also contact sides of transverse members 32, 33 and being interconnected by rivets 34A, 35A.

The movable steering front runner section 13 comprises a pair of similar, parallel runners 40, each being made of a single piece of tubing of rectangular or square section, bent to proper shape. Thus, runner 40 comprises a runner portion 41, an upwardly forwardly inclined portion 42 at the forward end thereof, a top portion 43 above runner portion 41 and interconnected to portion 42 at the forward ends thereof by an arcuate portion 44. The runner 40 further includes a downwardly and rearwardly inclined portion 45 extending from the rear end of top portion 43 and terminating in a flattened end portion 46 which is received in a slot formed in the top surface of runner portion 41 and secured in place by a cross rivets 47 at a point spaced from the rear end 48 of said runner portion 41.

The runners 40 are interconnected by a cross member 49 of tubular, square cross section and having flattened ends 50 received in slots formed in the inner side portions of top runner portions 43, being secured in place by cross rivets 50A. Furthermore, an arched bracket 51 underlies cross member 49 with its opposite ends flattened as at 52 and received in slots formed in top surface portions of runner portions 41 and cross riveted as at 52A. A rivet 53 connects the mid portion of cross member 49 and of bracket 51.

The runners 40 are further interconnected by the steering handle bar 54 of tubular section, which extends transversely of and contacts the forward ends of top runner portions 43 and is secured thereto by rivets 54A. Handle bar 54 includes outwardly projecting handle portions 55 carrying hand grips 55A.

A semicircular tubular stabilizer member 56 is disposed rearwardly of handle bar 54, said member 56 having its opposite ends flattened as at 57 and received in slots formed in rear portions of bar 54 and cross riveted as at 57A. The central portion of stabilizer 56 is slightly spaced from the midportion of the transverse deck supporting portion 27.

A pivot pin 58 interconnects a forward portion of deck member 17 and the midportion of handle bar 54 with an interposed plastic bearing and spacing collar 59. Bearing strips 60 of nylon or other wear resisting plastic are fixed to the upper surface of handle bar 54 to underlie and contact deck rail portions 15. In addition, a bearing strip 61 of nylon or the like, is fixed to the underside of central deck member 17 so as to overlie and contact the top surface of medial portions of the stabilizer member 56.

It will be apparent that the sled 10 may be steered by grasping hand grips 55A to pivot front runner section 13 about pivot pin 58 while the moving runner section is stabilized through the smooth bearing action of strips 60, 61, as well as collar 59, all of which maintain the runner section 13 in true relation to deck section 11, despite adverse snow, ice or terrain conditions.

Furthermore, means is provided for automatically restoring the front runner section 13 to its proper longitudinal alignment with rear runner section 12, when the sled 10 is lifted from the ground. To this end, an angle bracket 62 is centrally located on the underside of central deck member 17. Bracket 62 includes an elongated central portion 63 which is fixed at its rear end to a midportion of deck supporting portion 27 with a spacing collar 64 therebetween. Bracket portion 62 extends forwardly over the midsection of stabilizer member 56 and terminates in an angle portion 65 which is riveted to the underside of central deck member 17, with the forward end of bearing strip 61 interposed therebetween, as by rivet 65A.

Figure 4:
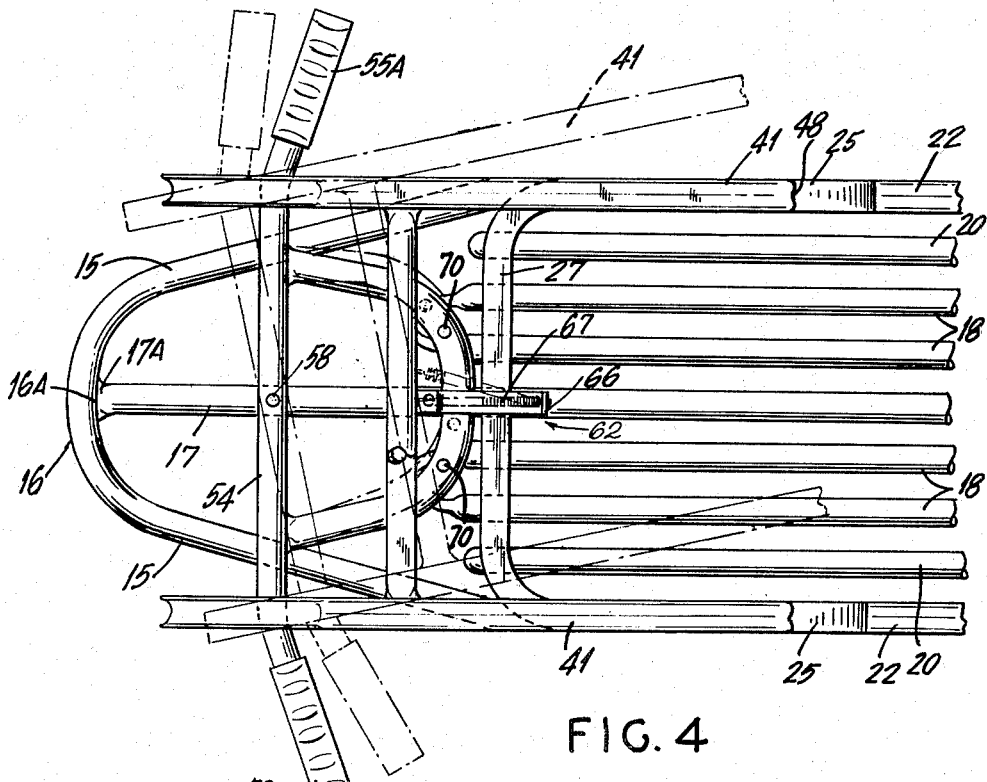
FIG. 4 is an enlarged bottom plan view of the frontal portion of the sled, showing details of the steering assembly.
Figure 5:
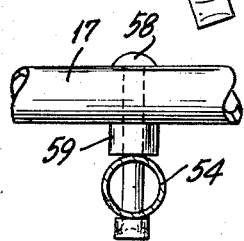
FIG. 5 is a partial elevational view, with parts in section, showing details of the pivotal connection of the steering assembly.
Figure 6:
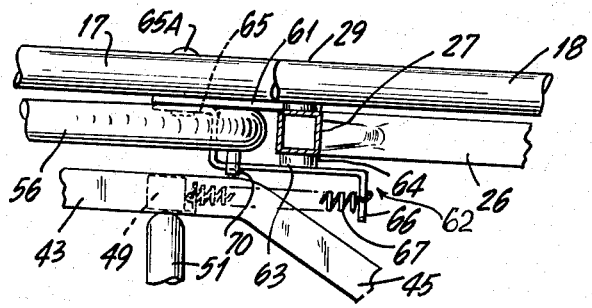
FIG. 6 is an enlarged, partial side elevational view with parts in section, showing details of the stabilizer member.

The bracket portion 62 includes a downwardly directed angle portion 66 at the rear end thereof, to provide an arm for anchoring the rear end of a coil spring 67, the forward end of which is secured between midportions of cross member 49 and bracket 51. It will be apparent that upon angular displacement of the front runner section 13, from its normal position, as indicated in dot-dash lines, FIG. 4, and then release thereof while sled 10 is raised from the ground, spring 67 in its tensioned condition will be effective to restore front runner section 13 to the normal position indicated in full lines, FIG. 4.

The angular displacement of front runner section 13, during steering, is limited by stops in the form of studs 70 secured on the underside of stabilizer member 56 on either side of and symmetrically related to, the midportion thereof. Stops 70 are adapted to engage the sides of bracket portion 62 to limit the extreme steering positions of front runner section 13.

The runner portions 22 of rear runner section 12 and runner portions 41 of front runner section 13 are formed of metal tubing of substantially square section, which may be of the order of about ¾" to 1" on a side. Preferably, the bottom surface portion 71 of said runner portions are indented longitudinally along a median line 72 to form a longitudinally extending shallow groove 73 therein. It has been found that the grooved runners provide stability and optimum support for sled 10 over a wide variety of snow and ice conditions.

Figure 7:
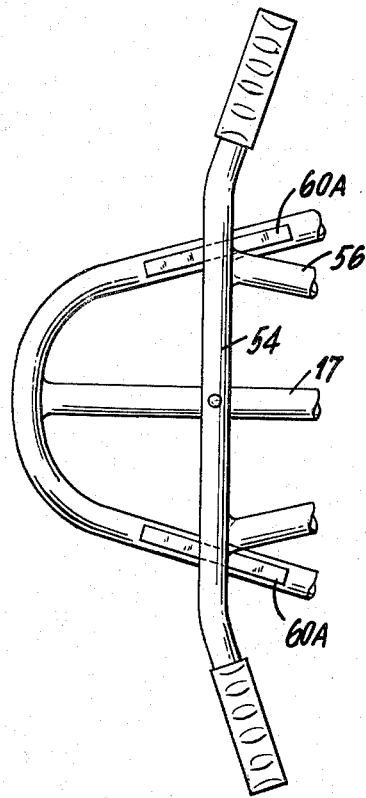
FIG. 7 is a partial bottom plan view showing an alternative form of steering assembly.
Figure 8:
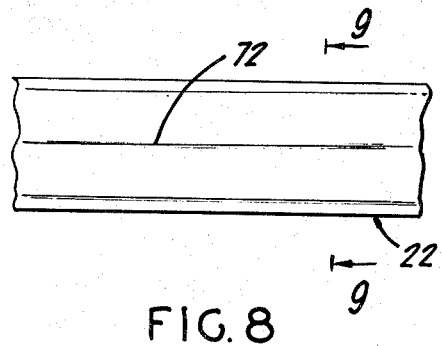
FIG. 8 is a partial bottom plan view of a runner portion.
Figure 9:
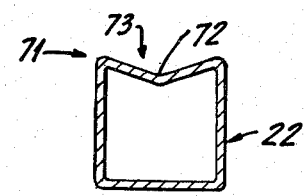
FIG. 9 is a sectional view taken on the line 9—9 of FIG. 8.

As an alternative, the laterally disposed bearing strips between deck rail portions 15 and handle bar 54, may be secured on the underside of said rail portions 15, as by adhesive or the like, as at 60A, FIG. 7. The handle bar 54 will make contact with bearing strips 60A, in all steering positions thereof.

It is understood that the deck section 11 may be made in part of wood, as by replacing deck members 17, 18, 20 with wood slats located between the outer rail portions.

As various changes might be made in the embodiments of the invention disclosed herein, without departing from the spirit thereof, it is understood that all matter herein shown or described shall be deemed illustrative and not limiting except as set forth in the appended claims.

What is claimed is:

1. A sled comprising a deck section, a rear runner section fixed to the underside of said deck section, a front steerable runner section pivotally mounted on the underside of said deck section on a fore portion thereof, said deck section comprising a pair of outer side rail portions, said front steerable runner section comprising a transversely disposed handle member in underlying relation to said side rail portions, stabilizer means extending rearwardly from said handle member, said stabilizer means including portions in opposed relation to medial portions of said deck section, bearing means between said stabilizer means portion and said medial deck section portion, and laterally disposed bearing means between opposed portions of said handle member and each of said side rail portions for slidable contact therebetween whereby said steerable runner section in any pivoted angular position relative to said rear runner section is maintained in truem stabilized relation said said runner section.

2. A sled as in claim 1 wherein said second mentioned bearing means comprises abrasion resistant plastic strips secured to upper surface portions of said handle member for sliding contact with under surface portions of said side rail portions.

3. A sled as in claim 1 wherein said mentioned bearing means comprises abrasion resistant plastic strips respectively secured to the under surface of said side rail portions for sliding contact with laterally displaced top surface portions of said handle member.

4. A sled as in claim 1 wherein said stabilizer means comprises an arcuate member extending rearwardly of said handle member with opposite ends thereof secured to laterally spaced portions of said handle member, and said first mentioned bearing means comprises an abrasion resistant plastic member secured to the underside of said medial portion of said deck section for slidable bearing contact with top surface portions of said stabilizer member.

5. A sled comprising a deck section, a rear runner section secured to the underside of said deck section and a steerable front runner section pivotally mounted on a fore portion of said deck section, said deck section comprising a pair of parallel, outer side rail portions, the rear runner section comprising a metal tubing member bent to provide a pair of laterally related, parallel runner portions, a pair of forwardly disposed laterally related, longitudinally extending deck supporting portions, a transversely disposed deck supporting portion interconnecting the forward portions of said pair of longitudinally extending deck supporting portions, a pair of rearwardly disposed laterally related, longitudinally extending deck supporting portions respectively longitudinally aligned with said forwardly disposed pair of longitudinally extending deck supporting portions, a pair of portions connecting the forward ends of said runner portions with the rear ends of said forwardly disposed pair of longitudinally extending deck supporting portions and a pair of portions connecting the rear ends of said runner portions and said rearwardly disposed pair of longitudinally extending deck supporting portions, means for securing rear end portions of said side rail portions with said rearwardly disposed pair of longitudinally extending deck supporting portions, and means for securing said transversely extending deck supporting portion to overlying portions of said deck section.

6. A sled as in claim 5 wherein said deck section further includes parallel tubing members disposed between said outer side rail portions, transverse members interconnecting the tubing members of said deck section, arched brace members having their outer ends in engaging relation with said runner portions and the intermediate portions thereof in underlying relation to the deck section.

7. A sled as in claim 5 wherein said runner portions are formed on the underside thereof with a longitudinally extending groove on medial portions thereof to provide laterally spaced longitudinally extending rib portions.

8. A sled comprising a deck section, a rear runner section fixed to the underside of said deck section, a front steerable runner section pivotally mounted on said deck section, said deck section comprising metal tubing bent to provide parallel side rail portions, an arcuate nose portion and converging portions interconnecting the forward ends of said side rail portions with said nose portion, and a longitudinally extending tubular member disposed intermediate said side rail portions with the forward end thereof in engaging relation to said nose portion said front runner section comprising a pair of parallel runner members, each runner member comprising a runner portion and a top runner portion above the runner portion and portions connecting the runner portion and top runner portion, a cross member interconnecting said parallel runner members, a handle member extending transversely of the top runner portions and secured thereto, and a pivot pin interconnecting a midportion of said handle member and the overlying portion of said longitudinally extending member of the deck section.

9. A sled comprising a deck section, a rear runner section fixed to the underside of said deck section, a front steerable runner section pivotally mounted on a fore portion of said deck section, said sections being formed of metal tubing, said deck section comprising side rail portions and a nose portion interconnecting said side rail portions and a centrally disposed longitudinally extending member between said rail portions with the forward end thereof in engaging relation with said nose portion, said front runner section comprising a pair of parallel runner members, a handle bar member extending transversely of said runner members and interconnecting said runner members, a stabilizer member of arcuate shape with the outer ends thereof in engaging relation to laterally spaced portions of said handle bar member and movable therewith, a bearing strip between said centrally disposed member of said deck section and medial portions of said stabilizer for sliding contact therebetween, bracket means on the underside of said deck section, coil spring means secured at one end thereof to said bracket means and secured at the other end thereof to said front runner section to restore said front runner section from positions thereof in angular relation to said rear runner section to a normally aligned relation to said rear runner section.

10. A sled as in claim 9 and further including means for limiting the angular displacement of said front runner section comprising a pair of laterally related stop members on said stabilizer member for abutment with said bracket means upon steering movement of said front runner section.

References Cited by the Examiner
UNITED STATES PATENTS

| | | | |
|---|---|---|---|
| 2,223,427 | 12/40 | Sherwood | 280—22 |
| 2,539,209 | 1/51 | Shakowitz | 280—16 |
| 2,835,539 | 5/58 | Conrad. | |

ARTHUR L. LA POINT, *Primary Examiner.*